W. E. JURY.
DIRECTION INDICATOR FOR VEHICLES.
APPLICATION FILED APR. 16, 1921.
1,392,171.
Patented Sept. 27, 1921.
2 SHEETS—SHEET 1.
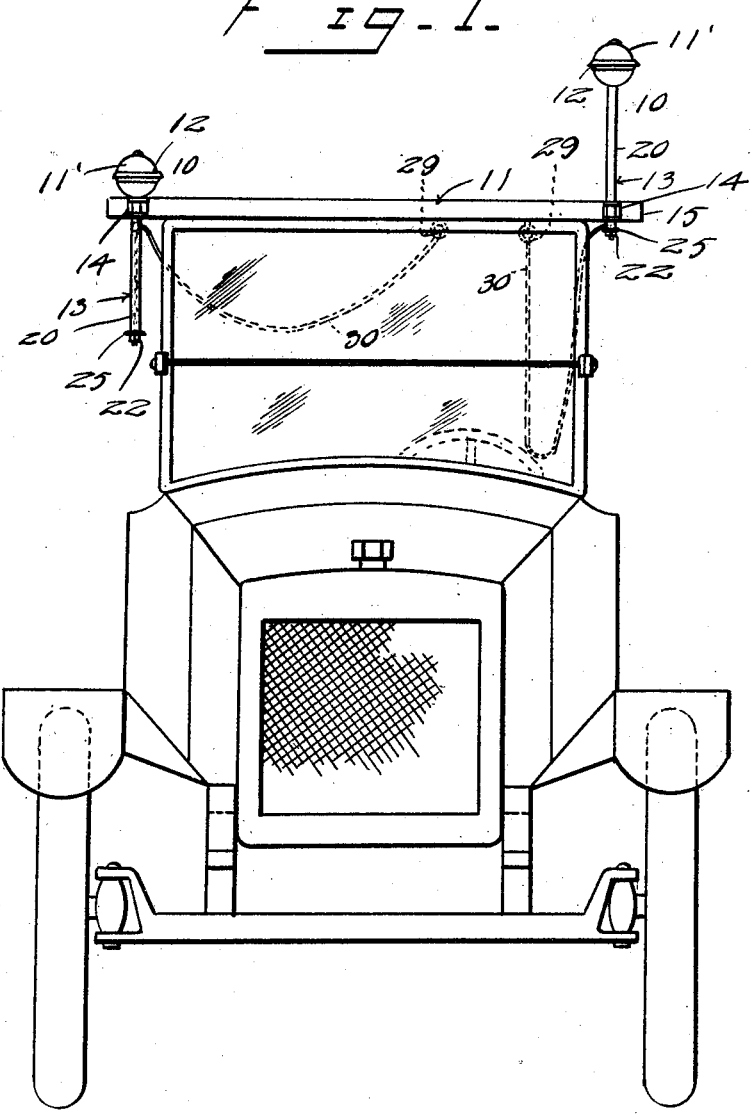
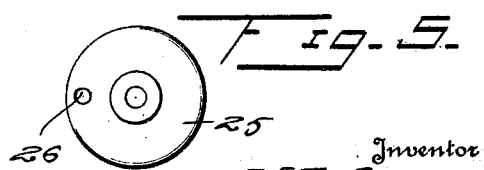
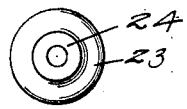
Inventor
W. E. Jury

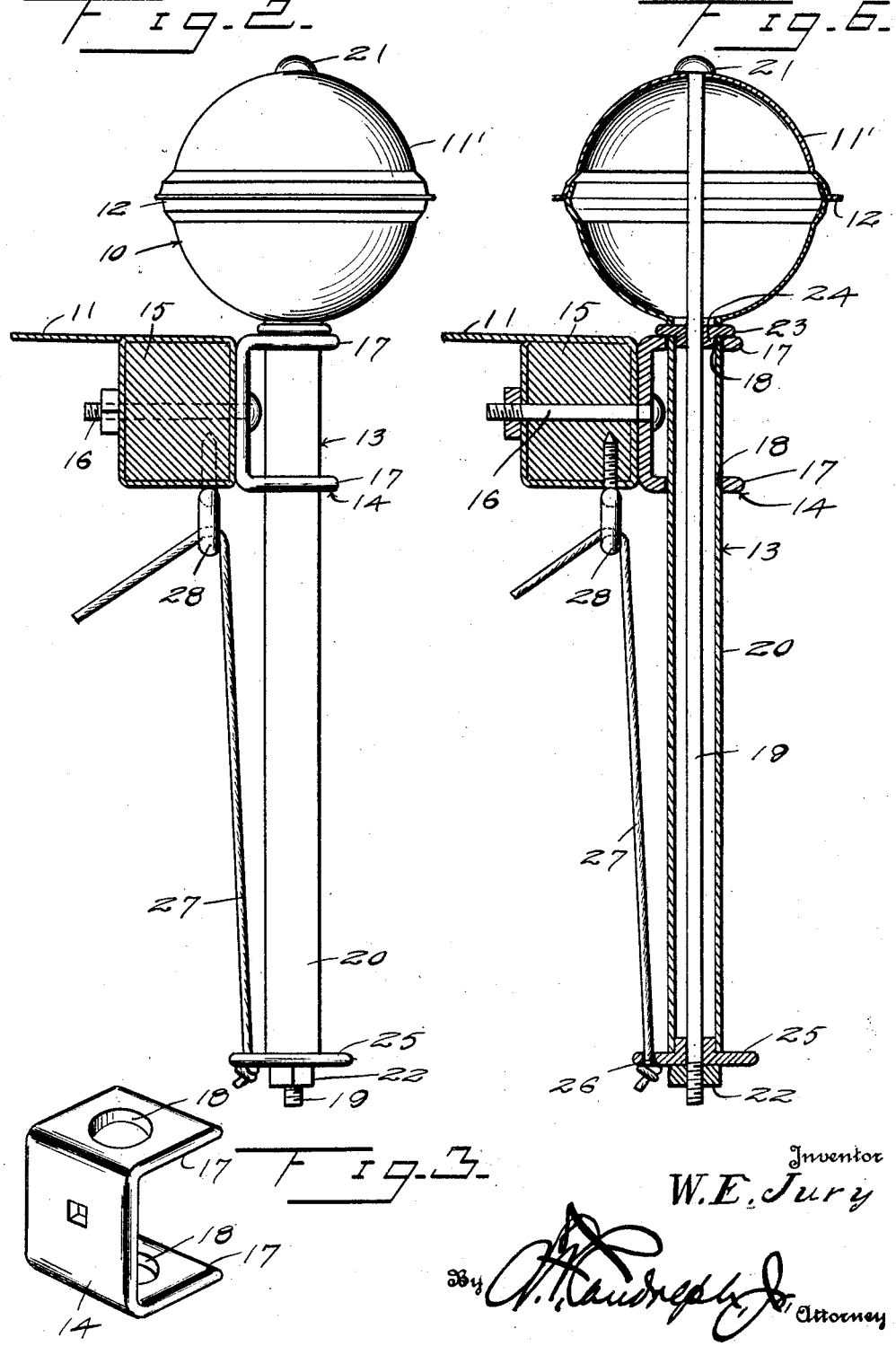

UNITED STATES PATENT OFFICE.

WILSON E. JURY, OF FREEPORT, ILLINOIS.

DIRECTION-INDICATOR FOR VEHICLES.

1,392,171. Specification of Letters Patent. Patented Sept. 27, 1921.

Application filed April 16, 1921. Serial No. 461,790.

*To all whom it may concern:*

Be it known that I, WILSON E. JURY, a citizen of the United States, residing at Freeport, in the county of Stephenson and State of Illinois, have invented certain new and useful Improvements in a Direction-Indicator for Vehicles; and I do hereby declare the following to be a full, clear, and exact description of the invention, such as will enable others skilled in the art to which it appertains to make and use the same.

The object of the invention is to provide a simple and peculiarly efficient direction indicator or safety signal for automobiles and similar motor driven vehicles and more particularly those vehicles used on crowded thoroughfares where the use of the arm or hand or any object projected laterally from the vehicle is of questionable or negligible utility as a means of providing against accident and where an important requirement of an efficient indicator or signal is to serve as a guide not only to following vehicle drivers but to the traffic officer who is responsible for the proper handling of the traffic at crossings and the like, and who should be apprised positively and for a considerable length of time of the intention of the drivers of all vehicles within view before they reach the intersection or crossing, so as to know how to dispose of the vehicles with the least interruption to progress and hence the least likelihood of causing congestion; and with these objects in view the invention consists in a construction and combination of parts of which a preferred embodiment is illustrated in the accompanying drawings, wherein:

Figure 1 is a front view of a vehicle equipped with direction indicating means constructed and arranged in accordance with the invention, one of the members of the apparatus being shown in its extended or indicated position.

Fig. 2 is a detail elevation of one of the indicating members.

Figs. 3, 4, and 5 are detail views detached of the guide brackets and washers arranged at the extremities of the sleeve.

Fig. 6 is a vertical sectional view of the indicating member shown in Fig. 2.

The indicator proper is preferably used in duplicate, comprising the members indicated generally at 10 and arranged preferably at the front right and left corners of the top 11 of the vehicle for extension upwardly or vertically so as to be visible from the rear front and sides of the vehicle and hence my be observed simultaneously by the traffic officer and the drivers of the following and preceding vehicles, and while the members are adapted for independent operation for the purpose of indicating the intention of the driver of the vehicle equipped therewith to turn either to the right or to the left at a cross street or intersection, both may be operated to indicate an intention to stop.

In the illustrated embodiment of the invention, the signaling element consists of a ball 11 having separable hemispherical sections jointed as at 12 to facilitate manufacture and minimize cost of production and a stem 13 which is slidingly mounted in a guide 14 adapted to be secured to a suitable support 15 such as the front bow of a vehicle top, by means of a bolt 16 or the equivalent thereof.

In the construction shown the guide 14 consists of a plate terminally deflected to form ears 17 provided with openings 18 through which the stem 13 extends, an assembling bolt 19 being extended axially through the sleeve 20 forming the exterior member of the stem and through the ball forming the signal element with a terminal head 21 engaging said ball and being engaged at the other end by means of a nut 22. A washer 23 also penetrated by the assembling bolt is provided with a reduced collar 24 fitted in an opening in the lower section of the signal element to constitute a stop to limit the downward movement of the signaling element by contact with the upper ear of the guide bracket 14, and a washer 25 is preferably secured in contact with the lower end of the sleeve 20 by means of the nut 22 and is provided with an eye 26 for engagement by an operating cord or tape 27 employed as a means of moving the stem upward in the guide to extend the signaling element. The washer 25 serves as a stop to prevent disengagement of the stem from the guide 14.

The operating cord or tape extends through a guide 28 which may be supported by the front bow 15 of the vehicle top and should thence extend to a point of attachment such as a screw eye 29 located about the center of the width of the top of the vehicle with the intermediate portion of the cord between the guide 28 and the attaching eye forming a loop 30 which may readily be grasped by the hand of the driver of the vehicle and drawn down to the steering wheel so that when for example it is desired to indicate an intention to turn to the right the proper loop of the appartus should be engaged or grasped and drawn down so as to permit the driver while holding the cord to manipulate the steering wheel and thus maintain the signaling element 11 in an extended position as a continuous warning or indication to the drivers of other vehicles and the traffic officer of his intention at the next crossing to turn to the right.

The duplication of the apparatus as above suggested provides for extending either of the signaling elements according to whether the driver intends to turn to the right or the left, and if he intends to stop may extend both signaling devices and hold the loops of the operating cords while maintaining the position of his hands on the steering wheel. Obviously the release of the operating cords which can be accomplished without removing the hands from the steering wheel will permit of the return of the indicating elements by gravity to their normal or inoperative positions.

Inasmuch as the device herein described is designed more especially for use in connection with vehicles which are used in places of congested traffic, the necessity for a lighting means in connection therewith is practicably negligible, because such congested traffic conditions rarely if ever exist except on well lighted thoroughfares in large cities or intersections of important roads and thoroughfares, and owing to the fact that the driver of each vehicle as he comes into the range of view of the traffic officer at the next crossing may operate his indicating device to show his intenton as to the direction of movement at the next crossing, the traffic officer is guided in the work of handling the traffic with the least likelihood of causing interruption or congestion. Obviously the leaving of the indicating elements of a vehicle in the normal position or depressed will serve to advise the traffic officer that the driver of that vehicle intends to proceed in the same direction and not turn out at the next crossing.

Having thus described the invention, what I claim is:—

1. A direction indicator having a signaling element provided with a stem, a guide for directing the stem for substantially vertical movement and an operating cord connected with said stem, the guiding means for the stem consisting of a clip adapted for attachment to a vehicle top bow.

2. A direction indicator having a signaling element provided with a stem, a guide for directing the stem for substantially vertical movement and an operating cord connected with said stem, the signaling element consisting of a sectional hollow sphere and the stem consisting of a sleeve and an assembling bolt extending axially through the sleeve and sphere and provided with terminal securing means.

In testimony whereof I affix my signature in presence of two witnesses.

WILSON E. JURY.

Witnesses:
WM. S. KRAFE,
MARTIN L. KORTEMEIER.